United States Patent Office 3,336,573
Patented Aug. 15, 1967

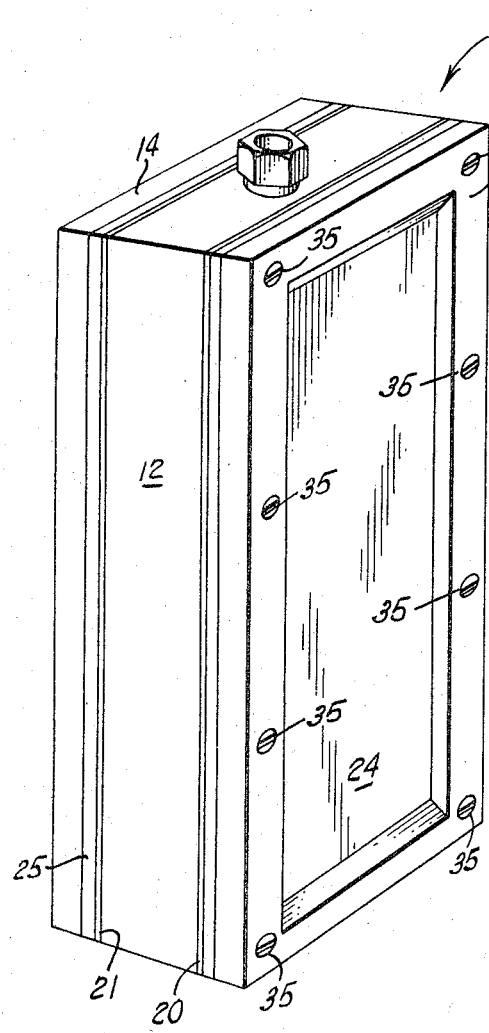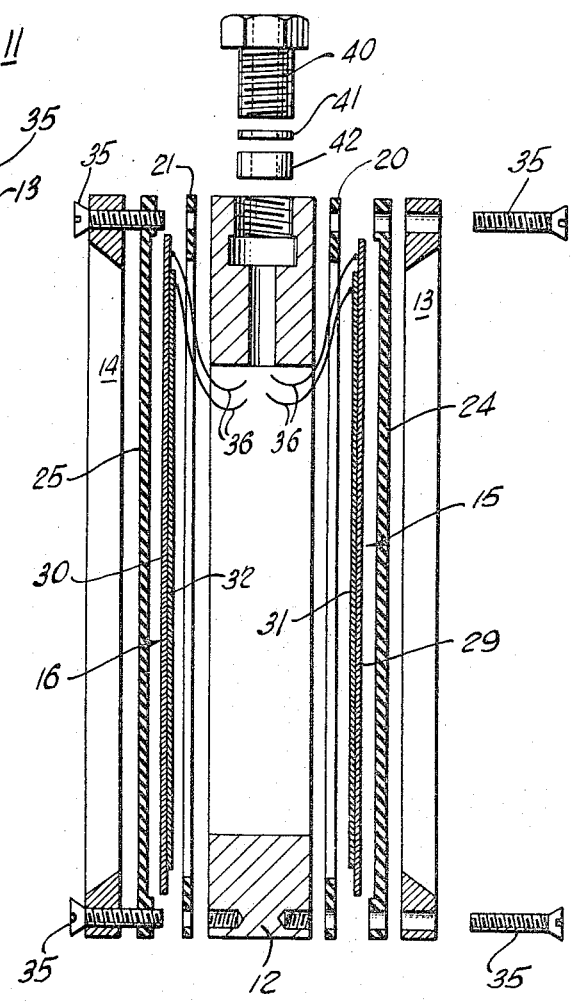

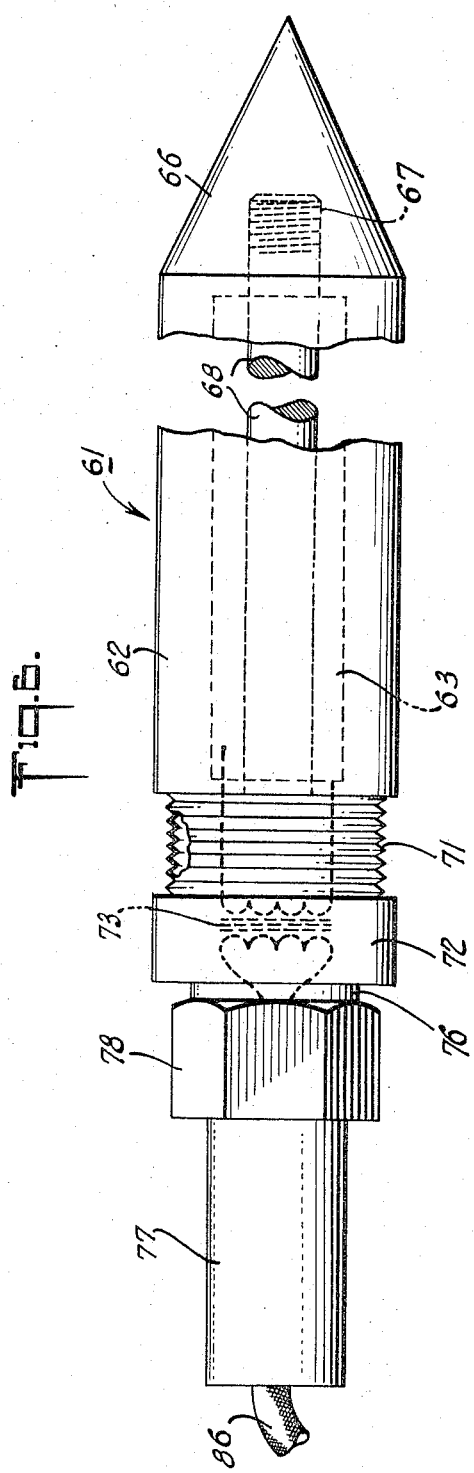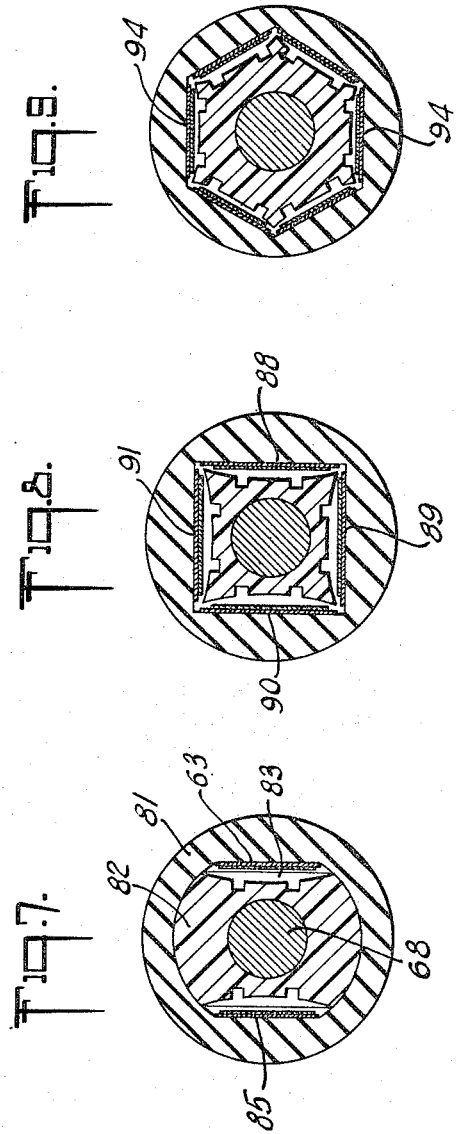

3,336,573
CRYSTAL PRESSURE SENSITIVE GEOPHONES FOR USE IN SOFT EARTH
Roy L. Gallaway, Houston, and Alvin L. Parrack, Bellaire, Tex., assignors to Texaco Inc., New York, N.Y., a corporation of Delaware
Continuation of application Ser. No. 536,477, Jan. 11, 1966. This application Sept. 14, 1966, Ser. No. 579,435
5 Claims. (Cl. 340—17)

ABSTRACT OF THE DISCLOSURE

A high sensitivity pressure type geophone apparatus for detecting seismic signals in soft earth. A pair of piezoelectric units are mounted with gaskets on opposite sides of a central body portion. Each of the piezoelectric units comprises a long rectangular flexible diaphragm of ductile material and a corresponding long thin flat flexible piezoelectric crystal adhesively bonded to the entire face of the diaphragm. The piezoelectric units are mounted to the body portion with their respective diaphragms facing away from one another so that pressure waves that impinge on the outward facing surfaces of the respective diaphragms cause flexure of the diaphragm and corresponding crystal to produce voltage variations in the crystals which are derived by appropriate electrical connections to the opposite faces of the respective crystals.

---

This is a continuation of application Ser. No. 536,477, filed Jan. 11, 1966, now abandoned, which is a continuation of application Ser. No. 90,059, filed Feb. 17, 1961, and now abandoned.

This invention is concerned with geophone structure in general, and more specifically concerns a type of geophone or seismic transducer that is especially adapted for use in soft earth, e.g., marsh areas. A geophone of this type is known as a pressure type, as distinguished from an inertia type.

Heretofore, the pressure type geophone employed has had a relatively low signal output level such that preamplifiers were required. Use of such preamplifiers added bulk and cost to the geophone structure and in addition was the cause of disturbance under certain conditions. The latter was true because a preamplifier is subject to being the source of pickup of extraneous signals such as those signals caused by static electrical disturbance due to thunderstorms and the like. This has been a serious drawback since in many marshy or shallow coastal areas where this type of geophone is employed, and especially during the season of the year when thunderstorms are frequent; there has been almost continuous electrical disturbance by reason of thunderstorms being within the general area if not directly at the location where operations are carried out.

In addition to the foregoing difficulties encountered in the prior art, even where it has been claimed that no preamplifier is required for an instrument that is commercially available, the structure of that instrument makes use of a circular diaphragm located on the bottom of the housing. For this reason when an instrument of that type is employed it is extremely difficult, if not practically prohibitive, to place it down into the soft earth without having some air trapped against the diaphragm on the bottom of the instrument. Any such air being trapped in such manner creates a bad distortion and in addition greatly reduces the transmission of seismic energy from the surrounding earth to the sensitive elements of the geophone.

Consequently, it is an object of this invention to provide an improved pressure type geophone for use in marshy or other soft earth areas.

Another object of this invention is to provide a pressure type geophone having greatly increased sensitivity so that the need for employing a preamplifier is eliminated.

Another object of this invention is to provide a pressure type geophone having greatly improved characteristics and employing a rectangular diaphragm bonded to a piezoelectric crystal as the sensitive unit.

Briefly, the invention may be described as a high sensitivity pressure type geogphone for use in marshes and the like. This geophone comprises in combination a housing including integral supporting structure for a piezoelectric unit therein. The said housing is adapted for ease in placing the geophone in soft earth by having an elongated longitudinal dimension and a relatively small cross-sectional area. The said piezoelectric unit includes a thin piezoelectric crystal bonded to one face of a ductile material diaphragm, the other face of said diaphragm is exposed to receive seismic wave energy and is located substantially parallel to said housing longitudinal dimension.

Again briefly, the invention may be described as a high sensitivity pressure type geophone having signal output strength sufficient to overcome the need for any preamplifier therewith. This geophone comprises in combination a cylindrical housing including integral supporting structure for a plurality of piezoelectric units therein. The said housing is elongated along the axis of said cylinder and adapted for placement in marsh areas and the like with said axis in an upstanding position. Each of the said piezoelectric units includes a thin piezoelectric crystal bonded to one face of a ductile material diaphragm, and each of said diaphragms has the other face thereof exposed to receive seismic wave energy. Each of the said diaphragms lies with the plane thereof parallel to said axis of said housing cylinder.

The foregoing and other objects and benefits of the invention will be set forth in greater detail, and made more clear in connection with the specific embodiments that are illustrated in the drawings and described below. In the drawings:

FIGURE 1 is a perspective view showing a laboratory style embodiment of the invention;

FIGURE 2 is a transverse cross-sectional view, shown in an exploded manner, indicating the elements of the FIGURE 1 geophone;

FIGURE 6 is a side elevation partly broken away to show interior structure and illustrating a possible modification adapted for field use; and, FIGURES 7, 8 and 9 are transverse cross-sectional views illustrating three different modifications that may be employed with a geophone of the type illustrated in FIGURE 6.

Figure 3:
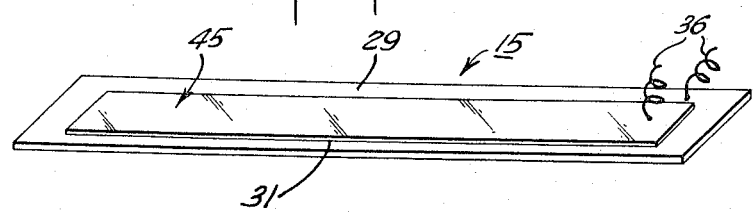
FIGURE 3 is a perspective view showing one of the piezoelectric units of a geophone according to the FIGURES 1 and 2 embodiments.

Referring to FIGURE 1 and FIGURE 2, there is illustrated one style of structure for a geophone in accordance with the invention, which may be employed in field use. It is pointed out that there is a housing 11 that includes a central body portion 12, to which there is fastened a pair of rectangular frames 13 and 14 for supporting and holding in place corresponding piezoelectric or pressure sensitive units 15 and 16. Each unit is supported spaced from the body 12 of the housing 11 by gaskets 20 and 21, respectively. On the other side of each piezoelectric unit, i.e., on the exposed face thereof, there are protective plastic material sheets 24 and 25, respectively. These sheets may be made of any feasible material and are preferably made of neoprene. Whatever material is used, it should readily transmit seismic pressure waves without distortion thereof.

Each of the piezoelectric units 15 and 16 is made up of two major elements, one of these elements being ductile material diaphragms 29 and 30, respectively; while, securely bonded to the diaphragm in each case there are thin piezoelectric crystal elements 31 and 32, respectively. The details of these two elements of each unit (e.g., diaphragm 29 and crystal 31) and the manner of bonding them together, will be described below in greater detail.

It will be observed that the frames 13 and 14 may be fastened to the body 12 in any feasible manner, e.g., by means of machine screws 35, as illustrated.

The electrical circuit connections for each of the piezoelectric units 15 and 16 may be carried out from within the body 12 by means of insulated wires 36. These wires would be connected in a desired manner and would extend up from the inside of body 12 to the exterior thereof through a passageway 37. This electrical circuit connection would be completed to external equipment (not shown) in a fluid tight manner relative to the interior of body 12 in any feasible way (not shown), e.g., by having a circular cross-section rubber coated electrical cable (not shown) of about the same size as the passageway 37. The fluid tight seal is accomplished in a standard manner in connection with a hollow bolt structure as illustrated with includes a bolt 40, washer 41 and fluid seal gasket 42 of a relatively soft deformable material such as soft rubber.

It is to be noted that the crystal elements 31 and 32 might be any feasible piezoelectric acting crystal material, but are preferably a type of crystal known as PZT which is chemically made up of three constituents including lead, zirconate and titanate. Furthermore, while this type of crystal may be sometimes called a ferroelectric crystal instead of a piezoelectric crystal, it is intended that the use of the term piezoelectric should be applied in its broad sense to include ferroelectric and other crystals which may be made to act in a piezoelectric manner. In other words, crystals which act such that electrical signals will be generated upon pressure being applied to the crystal, e.g. an E.M.F. will be generated thereby, are to be included in the use of the term piezoelectric herein.

It has been discovered as part of the invention that where as piezoelectric crystal is bonded to a ductile diaphragm, the sensitivity of the resulting unit varies inversely as the cube of the thickness of the diaphragm. Consequently the applicants have found that by employing a diaphragm having a thickness of less than one-tenth of an inch and preferably between 0.007 inch and 0.064 inch, the sensitivity of the unit may be such that sufficiently high amplitude signals will be generated to eliminate the need for any preamplifier in connection with a geophone employing this structure.

Figure 4:
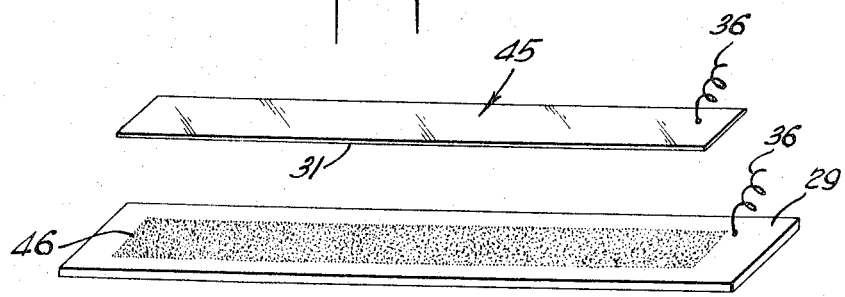
FIGURE 4 is a perspective view illustrating the same piezoelectric unit shown in FIGURE 3, but in an exploded manner in order to illustrate details of the construction.

Referring to FIGURES 3 and 4 it will be noted that, by way of example, the piezoelectric unit 15 is constructed with the diaphragm 29 thereof having securely bonded thereto the crystal 31 on one face thereof. Furthermore, in thus constructing the unit 14 the crystal 31 is first treated so as to provide electrodes on the two faces thereof. The structure of such electrodes is conventional and may be carried out by having a thin silvered coating 45 on each face thereof. Then the electrical connections from these electrodes are made in a standard manner, such as by soldering one of the wires 36 directly onto one silver surface 45 while the other face of crystal 31 (underneath as viewed in FIGURES 3 and 4) is bonded securely to one face of the diaphragm 29. The latter bonding is carried out using an electrically conductive cement so that an electrical circuit will be completed from the electrode 45 on the lower face of the crystal 31, via a layer of conductive cement 46, to the diaphragm 29 which is preferably metallic. Diaphragm 29 may be various materials (preferably metallic); and, particularly where the geophone is to be used in salt water areas, it should be a non-corrosive metal such as Phosphor bronze.

It is to be noted that with the structure employed, e.g. like that described above in connection with a piezoelectric unit, the physical action that causes generation of an electrical signal is such that when even small pressure changes are applied to the outer face of the diaphragm the consequent flexing of the diaphragm causes generation of substantial E.M.F.'s. The reason this is so is that the pressure change produces a flexing or displacement of the diaphragm that in turn produces a change in the length and width of the crystal. Such change in length and width of the crystal is accompanied by a change in thickness and it is this change in thickness which generates the indicated E.M.F. or voltage across the electrodes of the crystal.

Figure 5:
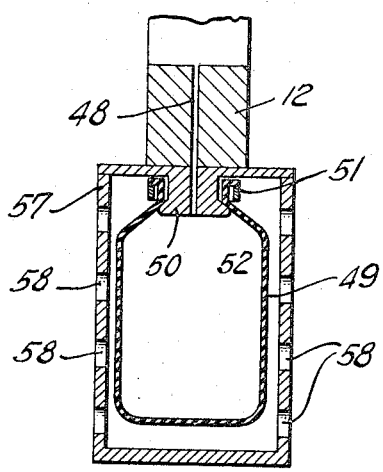
FIGURE 5 is a cross-sectional fragmentary view, showing the elements involved in a modification, that is applicable to the geophone structure according to the FIGURES 1 and 2 structure.

Referring to FIGURE 5, there is illustrated a modification which may be applied to the structure of a geophone according to FIGURES 1 and 2. This modification is to be employed in order to provide for compensation by adding to the internal pressure within the body 12 of the housing. This is particularly valuable where the geophone is to be employed under great pressures since such pressures would tend to cause an undue initial deflection of the diaphragms and might injure the structure of the piezoelectric units.

Thus as indicated above, high external pressure may be compensated for by providing at a convenient location in the body 12 of the geophone a small diameter bleed passage 48 that leads from the interior space within body 12 out to the interior of a normally extended bladder 49. The bladder 49 is attached in a fluid tight manner to a nipple 50 extending outward from the external surface of body 12, and around the bleed passage 48, beyond the outer surface of the body 12. In order to provide such fluid tight seal the nipple 50 may be securely attached to or made an integral part of the body 12 in any feasible manner. Similarly, any feasible structure may be employed in attaching the bladder 49 to the nipple 50, e.g., by the use of a snap ring 51 that is sprung into place around the neck of bladder 49 and above a flare or shoulder 52 on the nipple 50. The nipple 50 may be an integral part of a bladder housing element 57 that has perforations 58 therethrough to allow free passage for the surrounding fluid, as the geophone is buried. This housing 57 acts to protect the bladder 49 from any damage due to contact with a hard object. The surface area of bladder housing 57 that is in contact with the housing 12, is fastened securely in a fluid tight manner to the housing 12 so that the bleed passage 48 connects only the inner open portion within body 12 to the interior of the bladder 49.

The bladder 49 will be constructed so as to remain naturally in an open or non-collapsed state, in order that when external pressure is applied the bladder 49 will thus be compressed and tend to reduce its interior space or volume. This action will cause transfer of the interior air or other gas within bladder 49, to take place through the bleed passage 48 into the interior of the body 12 of the geophone housing 11. Such transfer will increase the pressure on the inside of the geophone so as to tend to equalize the pressure increase on the exterior thereof. It will be noted that the bleed passage 48 is sufficiently small in cross-sectional area so that although the change in static pressure may be compensated for in the indicated manner, rapid changes in pressure such as those created by seismic wave action, will not have time to equalize through this passage and consequently will actuate the diaphragms of the geophone in a normal manner.

Referring to FIGURES 6 and 7 through 9, there is illustrated a possible structure embodying the basic piezoelectric unit of this invention and providing a structural configuration which is more adaptable to actual field use of the geophone. FIGURE 6 illustrates the entire unit;

while FIGURES 7, 8 and 9 show three modifications of the interior structure, where two, four and six, respectively, of the piezoelectric units are employed.

In FIGURE 6 there is a geophone having a housing 61 that includes a main body portion 62 that is cylindrical in exterior configuration and is for supporting at least one piezoelectric unit 63 therein. At the lower end of housing 62, i.e., the right hand end as viewed in FIGURE 6, there is a cone-shaped member 66 that is attached to the end of the body 62 of the geophone. This member 66 may be attached in any feasible manner, e.g., by having an internally threaded socket 67 centrally located to receive the end of a core 68 which lies centrally within the housing 61 and extends through the body 62. This core 68 is preferably a strength giving support element and may be made of stainless steel or the like.

At the other end of body 62 from cone member 66 there is a bellows 71 for bridging the space between this end of the body 62 and the adjacent end of a short cylindrical section 72 which contains a transformer 73, which in turn is employed in making an impedance match from the piezoelectric unit, or units, to the electrical circuit connection leading to an amplifier or oscillograph element (not shown) at the recording unit (not shown).

The remainder of the geophone structure may take any feasible form, such as that illustrated where a short neck element 76 joins the transformer housing 72 with a handle 77, by means of a hexagonal collar 78. Collar 78 may be internally threaded to cooperate with threads (not shown) on the extension of the neck 76.

The piezoelectric unit 63 is in substance the same as the piezoelectric units 15 or 16, shown and described above. Consequently, no further description of the details of its structure need be repeated here. Unit 63 is, however, mounted within body 62 of the geophone by being molded within an external plastic portion 81 (see FIGURE 7) of the body 62. This plastic portion 81 is preferably constructed of a plastic material having qualities for permitting ready transmission of seismic wave energy from surounding fluid, or soft earth, to the diaphragm of piezoelectric unit 63. One satisfactory plastic material for this purpose is neoprene.

As shown in FIGURE 7, the piezoelectric unit 63 is mounted in such a manner that the unit is supported at the edges thereof only in order to permit flexing of the diaphragm when seismic pressure waves impinge thereon. Thus, surrounding the core 68 there is an inner plastic material element 82 which has a configuration such that there is formed a hollowed out space 83 located on the inside of the piezoelectric unit 63. Plastic element 82 is preferably a relatively stiff material for firmly supporting the edges of the piezoelectric unit 63. One satisfactory material for this element is Teflon. It will be clear from observing FIGURE 7 that this arrangement of the elements provides for allowing seismic pressure wave energies to pass freely through the external plastic portion 81 and impinge upon the piezoelectric unit 63 causing it to flex and create the signals by reason of this flecture, as indicated above. As further indicated in FIGURE 7, the geophone may be constructed with two piezoelectric units such as the unit 63 and a corresponding unit 85 on the other side of the geophone. These two units are connected together electrically so that the signals will reinforce one another and be transmitted via the transformer 73 to the electrical circuit connection over a cable 86, as indicated.

In FIGURES 8 and 9 there are indicated two additional modifications which may be employed in the geophone structure according to FIGURE 6. In each case it will be clear that the structure is such as to add a greater number of the piezoelectric units. For example, in FIGURE 8 there are four piezoelectric units 88-91 which symmetrically surround the inner structure and may be connected electrically in a reinforcing manner to provide greater sensitvity and a reduction of directionality of response. Similarly, in the FIGURE 9 modification there are six piezoelectric units 94 which may be conveniently mounted in a hexagonal manner to provide symmetry.

It will be observed that in all modifications of the invention the structure of the geophone is such that there is an elongated longitudinal dimension of the housing so that there may be a relatively small cross-sectional area for adapting the geophone structure to placement in soft earth or marshy areas. Furthermore each piezoelectric unit of the geophone, irrespective of what modification is employed, is mounted so that the plane of the piezoelectric unit lies substantially parallel to the longitudinal dimension of the housing. In this manner the piezoelectric unit will always lie substantially vertically, or in an upstanding position when the geophone is placed into the earth for use in receiving the seismic energies. Consequently any entrapment of air in contact with the external surface or face of the piezoelectric unit, is always avoided.

In addition, as already indicated above, it has been discovered as a feature of the invention that the sensitivity of a piezoelectric unit of this type varies inversely as the cube of the thickness of the diaphragm. Furthermore, it has been discovered that while preferable diaphragm thickness lies between the dimensions of 0.007 and 0.064 inch, an optimum thickness has been found to be 0.032 inch of diaphragm thickness.

While certain embodiments of the invention have been described above in considerable detail in accordance with the applicable statutes, this is not to be taken as in any way limiting the invention but merely as being descriptive thereof.

We claim:

1. A high sensitivity pressure type geophone for use in marshy areas and the like comprising a long relatively narrow housing having a central body portion defining a long narrow opening therein, a pair of piezoelectric units, gasket means for mounting said piezoelectric units on opposite sides of the narrow dimension of said central body portion enclosing said long narrow opening therein, a pair of rectangular frames completing said housing for holding said piezoelectric units in place, said piezoelectric units each comprising a long rectangular flat flexible ductile material diaphragm having a thickness of between 0.007 inch and 0.064 inch and a long thin, flat, flexible piezoelectric crystal of substantially the same length and width as the free area of the inward facing surface of said diaphragm, means for adhesively bonding one entire face of said crystal to the free area of the inward facing surface of said diaphragm, means for making electric connections to opposite faces of said piezoelectric crystal, means in said housing for permitting pressure waves in said marshy areas to impinge on the outward facing surface of said diaphragm to cause flexure of said diaphragm and corresponding flexure of said crystal thereby producing corresponding voltage variations at said electric connection means.

2. A high sensitivity pressure type geophone according to claim 1, wherein said diaphragm has a thickness of 0.032 inch.

3. A high sensitivity pressure type geophone according to claim 1 wherein said crystal is lead-zirconate-titanate.

4. A high sensitivity pressure type geophone according to claim 1, wherein said diaphragm is metallic and said means for adhesively bonding one entire face of said crystal to the free area of the inward facing surface of said diaphragm is electrically conductive.

5. A high sensitivity pressure type geophone according to claim 1, wherein said means for adhesively bonding one face of said crystal to the entire free area of the inwardly facing surface of said diaphgram is an electrically conductive cement.

(References on following page)

References Cited

UNITED STATES PATENTS

| | | | |
|---|---|---|---|
| 2,558,563 | 6/1951 | Janssen | 179—110.1 X |
| 2,708,585 | 5/1955 | Vogel | 340—17 X |
| 2,762,032 | 9/1956 | Vogel. | |
| 2,787,777 | 4/1957 | Camp | 340—10 |
| 2,961,635 | 11/1960 | Trott | 340—8 |
| 3,025,359 | 3/1962 | Schilling et al. | 340—10 X |
| 3,079,584 | 2/1963 | Sims | 340—10 |
| 3,166,730 | 1/1965 | Brown et al. | 340—10 |
| 3,255,431 | 6/1966 | Howatt | 340—10 |

FOREIGN PATENTS 815,873   7/1959   Great Britain.

SAMUEL FEINBERG, *Primary Examiner.*

R. M. SKOLNIK, *Assistant Examiner.*